United States Patent Office 3,631,099
Patented Dec. 28, 1971

3,631,099
PREPARATION OF UNSATURATED ALDEHYDES AND ACIDS
Jamal S. Eden, Akron, Ohio, assignor to The B. F. Goodrich Company, New York, N.Y.
No Drawing. Continuation-in-part of application Ser. No. 483,862, Aug. 30, 1965, now Patent No. 3,401,198. This application Aug. 28, 1967, Ser. No. 663,557
The portion of the term of the patent subsequent to Sept. 10, 1985, has been disclaimed
Int. Cl. C07c 57/04
U.S. Cl. 260—533 N                    6 Claims

ABSTRACT OF THE DISCLOSURE

Unsaturated acids and aldehydes, as acrylic acid and acrolein, are prepared together in excellent yields by the oxidation of an olefin as propylene in the presence of a catalyst containing a II-A metal molybdate, as strontium molybdate, tellurium oxide and phosphorus pentoxide.

CROSS REFERENCE TO RELATED APPLICATION

This is a continuation-in-part of my copending application Ser. No. 483,862, filed Aug. 30, 1965, now U.S. Pat. 3,401,198.

BACKGROUND OF THE INVENTION

In my copending application, Ser. No. 483,862, there is disclosed a method for preparing unsaturated aldehydes and unsaturated carboxylic acids by oxidation of unsaturated hydrocarbons at an elevated temperature in the presence of a catalyst containing molybdenum oxide, tellurium oxide and an alkaline earth Group II-A metal phosphate.

SUMMARY OF THE INVENTION

I have now found that when olefins such as propylene are reacted with oxygen at an elevated temperature in the presence of a catalyst containing a Group II-A metal molybdate, such as strontium molybdate, tellurium oxide and phosphorus pentoxide, that excellent conversion and yield of propylene to both acrylic acid and acrolein are obtained. While strontium molybdate is a preferred material, barium and calcium molybdate are also useful. Control of the ratio of aldehyde/acid by varying reaction conditions with the strontium and barium catalysts provides a useful and economical system.

DETAILED DESCRIPTION

The reactants for providing aldehydes are propylene or isobutylene, a molecular oxygen-containing gas which can be pure oxygen, oxygen diluted with an inert gas, oxygen enriched air or air, per se.

Stoichiometric ratios of oxygen to olefin for the purposes of this invention are 1:1. While lower ratios of oxygen can be used at a sacrifice of yield it is preferred to use about ⅓ to ⅔ excess oxygen. Large excesses of oxygen, while not undesirable, introduce process problems and require larger equipment. An amount of oxygen from about 1 to about 4 mols of oxygen per mol of olefin is an adequate range.

The use of steam in the reaction while desirable is not absolutely essential. The amount of steam used may be varied from about 0 to 10 or more mols per mol of olefin. Other diluent gases such as nitrogen, saturated hydrocarbons such as propane or butane may be used if desired.

The reaction may be carried out in either fixed or fluidized catalyst bed.

The reaction temperature can range from about 300° C. to about 500° C. A preferred range is from about 350° C. to about 450° C.

The contact time may vary considerably in the range of about 2 to 70 seconds. Good results have been obtained within the range of about 10 to about 50 seconds.

The reaction may be conducted at atmospheric pressure, in a partial vacuum, or under induced pressures up to 100 p.s.i. or higher. Atmospheric pressure is preferred for fixed bed systems and higher pressures for fluid bed reactions.

The particle size of the catalyst for fixed bed operations may be from about 10 to 18 mesh. Larger and smaller size particles may be used in fixed beds if desired. For fluid bed operations, the catalyst size normally will range from about 80 to 325 mesh (U.S. sieve).

The catalyst containing, strontium molybdate for example, tellurium oxide and phosphorus pentoxide may be prepared by a number of methods and may be supported or unsupported. The catalyst ingredients may be mixed in the form of solutions or slurries, or can be dry blended.

A general procedure for preparing the catalyst is to make a slurry of the II-A metal molybdate, add a slurry of ammonium tellurate thereto, and then add phosphoric acid. The resulting mixture is evaporated to dryness on a steam bath, calcined in a hot tube oven for 16 hours at 400 to 425° C., cooled to room temperature and meshed to the desired size.

Supported catalysts may be prepared by adding a dry support or aqueous slurry thereof to the catalyst ingredients. Alternatively, powdered molybdate and ammonium tellurate may be mixed with phosphoric acid, a dry support added thereto and dried.

Among suitable supports are silica, silica-containing materials such as diatomaceous earth, kieselguhr, silicon carbide, clay, aluminum oxides and the like.

Specific catalyst compositions used in the examples herein were prepared by mixing one mol of II-A metal molybdate in a water slurry with 89.2 grams of ammonium tellurate in a water slurry and then 115.3 grams of 85% $H_3PO_4$. The resulting mixtures were evaporated to dryness on a steam bath and calcined in a hot tube oven overnight at 400 to 425° C. The catalyst was ground to a mesh size of 10 to 18 mesh (U.S. sieve). This catalyst contained a molar ratio of 100 II-A molybdate, 33 tellurium oxide and 50 phosphorus pentoxide. Catalysts with molar ratios of 100 II-A metal molybdate, 10–100 tellurium oxide and 10–100 phosphorus pentoxide are useful in oxidizing propylene or isobutylene to acrolein and acrylic acid or methacrolein and methacrylic acid in excellent yields. Better results have been obtained with $SrMoO_4$ and $BaMoO_4$.

As an example of demonstrating preparation of a supported catalyst containing the II-A metal molybdate the ammonium tellurate and phosphoric acid there is added to the aqueous dispersions described above 315 grams of a 30–35% colloidal dispersion of microspheroidal silica (Ludox H.S.) is added slowly with stirring. After thorough mixing the catalyst is dried as described above. This provides, on a molar basis, in these catalysts 180 $SiO_2$. Another procedure is to add the mixture of ingredients to the Ludox or the ingredients may be added to the Ludox individually.

EXAMPLE I

A series of runs was made in a fixed bed reactor of a high silica (Vycor) glass tube 12" long and 30 mm. outer diameter. The reactor had inlets for air, steam and propylene. External electrically operated heating coils were wound on the reactor. Outlet vapors were passed through a water cooled condenser and the uncondensed gases were passed through a gas chromatograph and analyzed continuously. The liquid condensate was weighed and analyzed for unsaturated acid and aldehyde in the gas chromatograph. 170 ml. of catalyst prepared as described above and containing 100 $SrMoO_4$, 33 $TeO_2$ and 50 $P_2O_5$ was placed in the reactor. Steam at a temperature of 200 to 250° C. was first fed into the reactor, and thereafter propylene and air were separately fed into the reactor from preheaters at a temperature of about 200 to 250° C. Before the propylene was added, the reactor was preheated to about 285° C. The molar ratio of reactants used was one mol of propylene, 4.2 mols of steam and 3.04 mols of oxygen. The reaction temperature, contact time (calculated at room temperature and pressure), conversion and yield obtained in the several runs are set forth in Table I.

TABLE I

| Run | Temperature, °C. | Contact time, seconds | Mol percent propylene converted | Mol percent yield on propylene converted | |
|---|---|---|---|---|---|
| | | | | Acrolein | Acrylic acid |
| 1 | 385 | 36.5 | 98.01 | 47.65 | 35.0 |
| 2 | 390 | 36.5 | 97.89 | 43.20 | 32.30 |
| 3 | 405 | 36.5 | 100.0 | 30.72 | 45.16 |
| 4 | 394 | 32.6 | 95.6 | 48.66 | 31.46 |
| 5 | 405 | 32.6 | 97.58 | 40.26 | 37.10 |
| 6 | 400 | 36.5 | 100.0 | 29.26 | 46.73 |

When this example is repeated with isobutylene instead of propylene, good yields of methacrolein and methacrylic acid are obtained at 450° C.

EXAMPLE II

A A series of runs was made in the fixed bed reactor of Example I. 170 ml. of catalyst prepared as described above containing 100 $BaMoO_4$, 33 $TeO_2$ and 50 $P_2O_5$ was placed in the reactor. The molar ratio of reactants used was one mol of propylene, 4.2 mols of steam and 3.04 mols of oxygen. The reaction temperature, conversion, contact time (calculated at room temperature and pressure) and yields in the several runs are set forth in Table II below.

TABLE II

| Run | Temperature, °C. | Contact time, seconds | Mol percent propylene converted | Mol percent yield on propylene converted | |
|---|---|---|---|---|---|
| | | | | Acrolein | Acrylic acid |
| 1 | 380 | 46 | 95.66 | 64.55 | 23.87 |
| 2 | 405 | 46 | 97.18 | 57.17 | 27.31 |
| 3 | 395 | 49 | 91.42 | 60.02 | 31.06 |
| 4 | 370 | 60 | 74.09 | 75.76 | 14.27 |
| 5 | 400 | 60 | 98.07 | 34.70 | 30.08 |

The acrylic acid potential of Run 3 is about 77.5% by recycle of the reactor effluent.

EXAMPLE III

A series of runs was made in a fixed bed reactor as described in Example I. 170 ml. of catalyst prepared as described above containing 100 $CaMoO_4$, 33 $TeO_2$ and 50 $P_2O_5$ was placed in the reactor. The molar ratio of reactants used was one mol of propylene, 4.2 mols of steam and 3.04 mols of oxygen. The reaction temperature, contact time (calculated at room temperature and pressure), conversion and yield in the several runs is set forth in Table III.

TABLE III

| Run | Temperature, °C. | Contact time, seconds | Mol percent propylene converted | Mol percent yield on propylene converted | |
|---|---|---|---|---|---|
| | | | | Acrolein | Acrylic acid |
| 1 | 390 | 46 | 95.69 | 21.77 | 28.58 |
| 2 | 390 | 33 | 94.03 | 25.35 | 36.26 |
| 3 | 405 | 26 | 94.84 | 26.78 | 38.49 |

I claim:

1. The method for preparing unsaturated monoolefinic aldehydes and acids by oxidation of a hydrocarbon selected from the group consisting of propylene or isobutylene, comprising passing over a catalyst said olefin and oxygen in a ratio of about one mole of said olefin and 1 to 4 mols of oxygen at a temperature from about 300° C. to about 500° C., said catalyst consisting essentially of, on a molar basis, 100 $SrMoO_4$, $BaMoO_4$, or $CaMoO_4$ with 10–100 $TeO_2$ and 10–100 $P_2O_5$.

2. The method of claim 1 wherein the olefin is propylene, the molar ratio of oxygen is from about 1.5 to about 3, the reaction temperature is about 350 to about 450° C. and there is also present from 0 to 10 mols of steam per mol of propylene.

3. The method of claim 2 where the catalyst contains $SrMoO_4$.

4. The method of claim 2 where the catalyst contains $BaMoO_4$.

5. The method of claim 1 wherein the olefin is isobutylene, the molar ratio of oxygen is from about 1.5 to about 3, the reaction temperature is about 350 to about 450° C. and there is also present from 0 to 10 mols of steam per mol of isobutylene.

6. The method of claim 5 wherein the catalyst contains $SrMoO_4$.

References Cited

UNITED STATES PATENTS 3,401,198   9/1968   Eden _____ 260—533
3,451,945   6/1969   Eden _____ 260—533 X LORRAINE A. WEINBERGER, Primary Examiner R. D. KELLY, Assistant Examiner U.S. Cl. X.R.

252—437; 260—604 R